No. 686,788. Patented Nov. 19, 1901.
F. WAGNER.
MEANS FOR LUBRICATING PISTONS AND SLIDES OF LOCOMOTIVES.
(Application filed Feb. 4, 1899.)
(No Model.) 3 Sheets—Sheet 1.
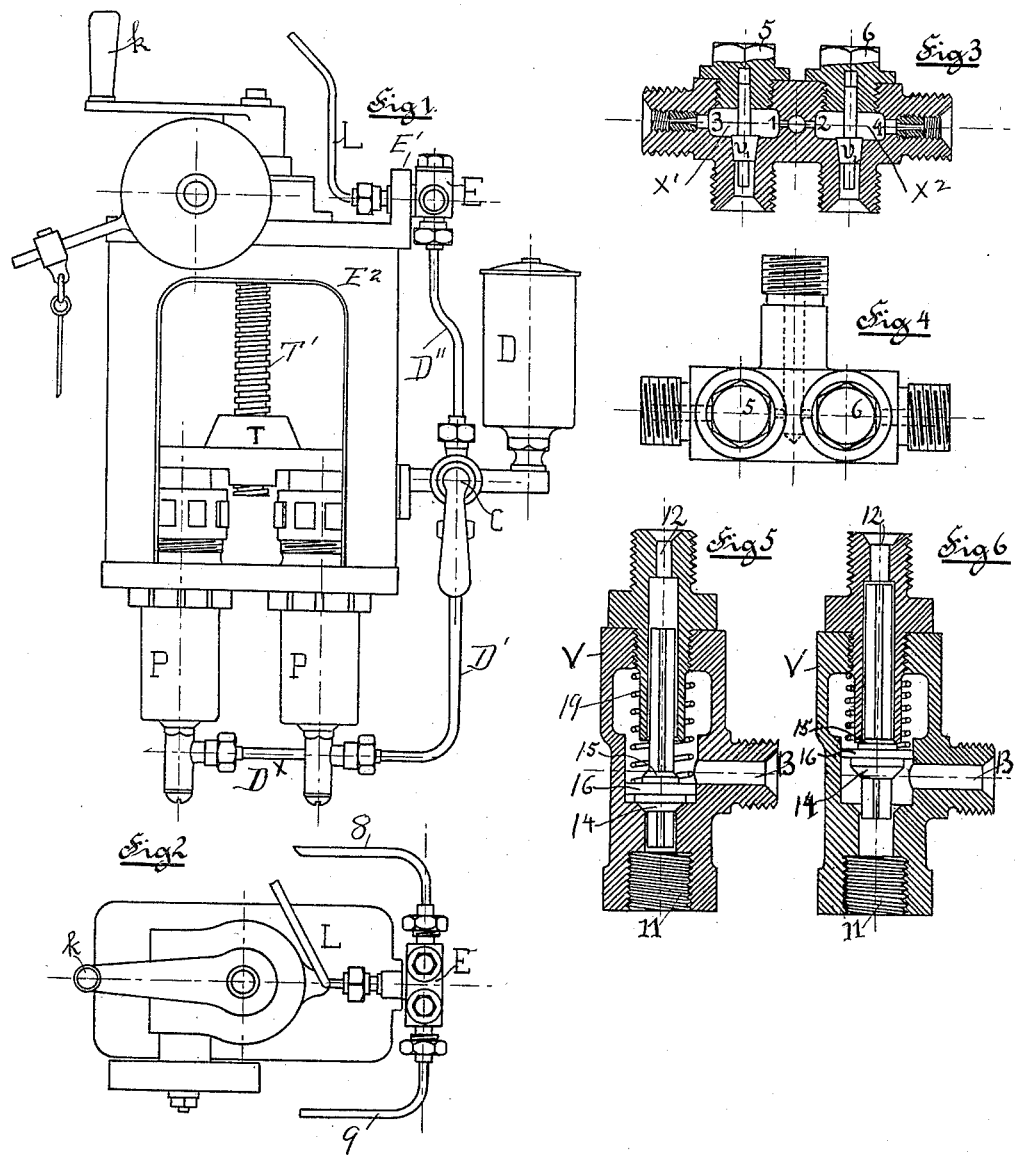
WITNESSES:
Ella L. Giles.
INVENTOR
Franz Wagner
BY
ATTORNEYS No. 686,788. Patented Nov. 19, 1901.
F. WAGNER.
MEANS FOR LUBRICATING PISTONS AND SLIDES OF LOCOMOTIVES.
(Application filed Feb. 4, 1899.)
(No Model.) 3 Sheets—Sheet 2.
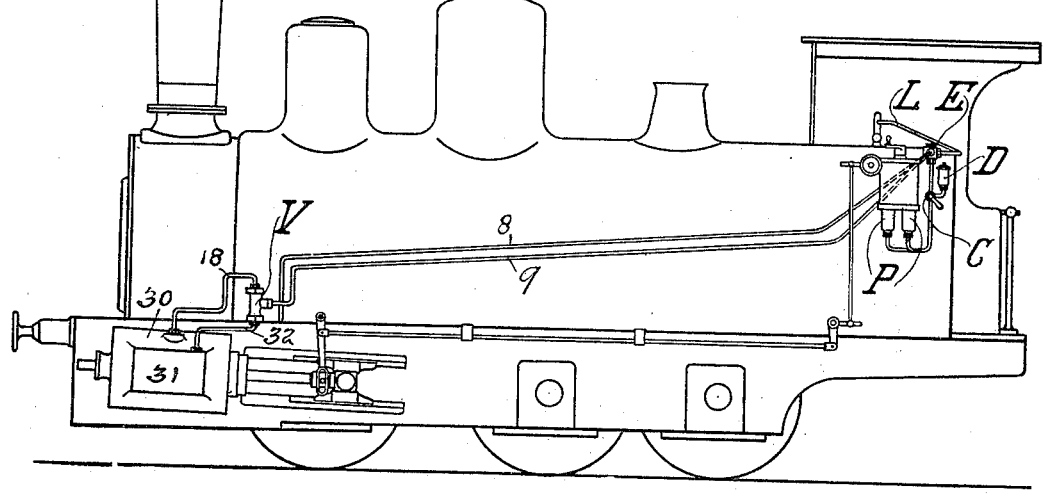
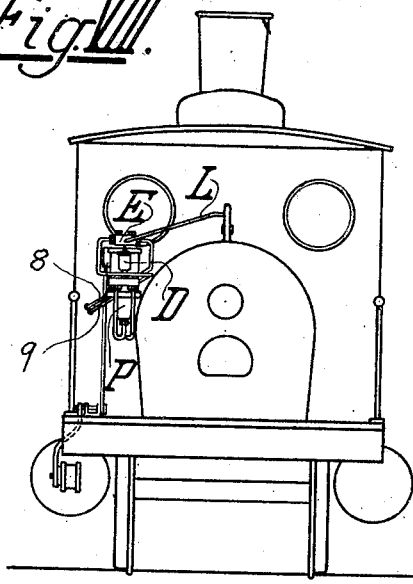

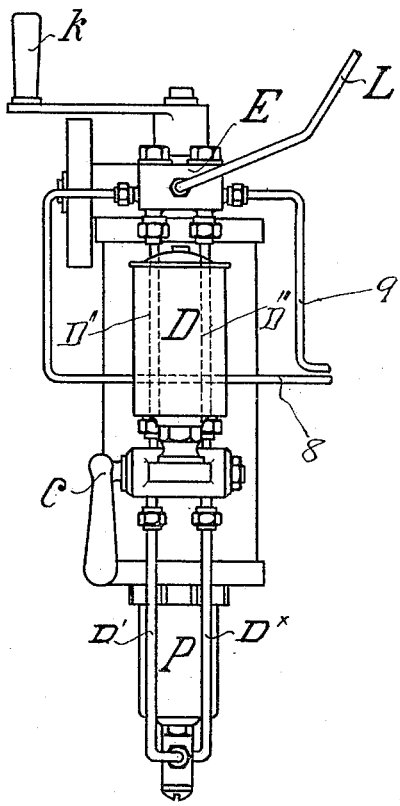

UNITED STATES PATENT OFFICE.

FRANZ WAGNER, OF NUREMBERG, GERMANY.

MEANS FOR LUBRICATING PISTONS AND SLIDES OF LOCOMOTIVES.

SPECIFICATION forming part of Letters Patent No. 686,788, dated November 19, 1901.

Application filed February 4, 1899. Serial No. 704,566. (No model.)

*To all whom it may concern:*

Be it known that I, FRANZ WAGNER, a subject of the King of Bavaria, and a resident of Nuremberg, Bavaria, Germany, have invented certain new and useful Improvements in Means for Lubricating Pistons and Slides of Locomotives, of which the following is a specification.

My invention consists in an improved system for lubricating the working parts of locomotive-engines.

In the accompanying drawings, Figure 1 is a side view of the reservoir for the lubricant, the cylinders from which the lubricant is forced to the parts to be lubricated, and the attached parts. Fig. 2 is a plan view of Fig. 1. Fig. 3 is a sectional view of the spraying device for the lubricant. Fig. 4 is a plan view of Fig. 3. Figs. 5 and 6 are sectional views of a distributing device, showing the distributing-valve in two different positions. Fig. 7 is a side view, and Fig. 8 a rear view, of a locomotive with my improvement attached. Fig. 9 is a detail side view of the right side of Fig. 1.

The reservoir for the lubricant D is arranged in the cab of the locomotive, and to this is connected pipes $D'$ $D^\times$, which lead separately to two cylinders P P. With these pipes a three-way cock C is arranged, and when this is properly turned the lubricant will flow from the reservoir into these cylinders, to be subsequently forced therefrom to the parts to be lubricated—that is, the cylinders and slide-valves of the engines. After the forcing-cylinders P P have been filled the three-way cock is turned into the position shown in Fig. 1, so as to open communication between the forcing-cylinders P P and the spraying device E, supported by a bracket $E'$ upon the framework $E^2$, and thus cutting off the supply from the reservoir D. The frame $E^2$ also serves to support the forcing-cylinders P P. The plungers, which are movable within the cylinders, are connected with each other by a common cross-piece or traverse T and are moved up and down, as may be required, in the usual manner by the rotation of the male screw $T'$, set in a female screw-thread of the traverse T. The revolution of the male screw takes place in the usual manner by a ratchet-wheel, which is actuated from the cross-head or one of the driving-wheels, or it takes place by hand by a crank $k$ after disconnecting the said ratchet-wheel. The lubricant from the force-feed cylinders P P passes to the spraying device through the pipes $D'$ $D^\times$ and their continuations $D''$, Figs. 1 and 9, and from the spraying device the oil passes to the parts to be lubricated, as will be hereinafter described.

The spraying device E comprises a casing having therein two valves $v'$ $v^2$, which control chambers $x'$ $x^2$ in the casing. These valves are arranged to close toward the oil-supply pipe $D''$, and the chambers $x'$ $x^2$ communicate, by means of openings 1 2, respectively, with a pipe L, which leads from the boiler of the locomotive. This pipe and its relation to the other parts are shown in Figs. 2, 7, and 8, the latter figures representing the pipe as being connected with the boiler. The chambers $x'$ $x^2$ have, respectively, ports or nozzles 3 4, with which connect the pipes 8 9, leading, respectively, to the right and left hand cylinders of the engine. The pipe 8 is shown in Figs. 7 and 8 as running along the same side of the boiler as the pipe 9; but at its forward end it extends transversely under the boiler to the right-hand cylinder. The stems of the valves $v'$ $v^2$ are guided in plugs 5 and 6, which are screwed into the casing of the spraying device. The steam, entering the spraying device by way of the pipe L, passes to the right and left over the valves $v'$ $v^2$ and through the nozzles 3 4, and by this action the oil entering through the valves $v'$ $v^2$ is taken up, atomized, and is forced through the pipes leading to the steam-cylinders. I interpose in the connecting-pipe leading from the spraying device to the engine-cylinders a distributing device V, one of which is located near each of the said cylinders. The function of each of these distributing devices is to supply the oil automatically and as required either to the slide-valve or to the piston of the engine. Each distributer comprises a casing containing a valve-chamber and a valve 16. A port 13, Fig. 5, is connected with the pipe 8 or 9, leading from the spraying device, and through this the distributer receives the steam and atomized lubricant. A port 12 is connected by a pipe 18, Fig. 7, with the cylinder 30 of the engine, so as to supply the piston thereof with oil, while a port 11 is connected by a pipe 32 with the slide-valve casing 31 of the engine through any suitable connection. (Not shown.) The valve 16 is of double formation—that is to say, the piston has a conical valve portion at its upper end and a conical valve portion at its lower end—and when in its lowest position its lower portion 14 is seated to close the port 11, leading to the slide-valve casing, and while in this position the steam and sprayed oil can pass through the port 12 to the cylinder, the stem of the valve being grooved or suitably formed for this purpose. The valve is normally pressed down by a spring 19 and by its own weight. When the engine is running under steam, the steam from the slide-valve casing entering through the port 11 forces the valve 16 upwardly until the upper conical valve portion contacts with the upper valve-seat, and thus opens communication with the port 13, as in Fig. 6, so that the sprayed oil may pass to the slide-valve and lubricate these parts, and, mingling with the live steam, the lubricant will enter the cylinder as the slide-valve admits the steam first to one end of the cylinder and then the other, as in the ordinary operation of these parts. When steam is shut off and the engine continues to run, there is no pressure of steam entering through the port 11, and the valve 16 will then be free to fall, which it will do by gravity and also by the power of the spring 19 and by the steam which may be in the valve-chamber above the valve, which was admitted previously through the port 12 from the cylinder when the parts were under steam. The valve now assumes the position of Fig. 5, and the lubricant will pass to the cylinder through the port 12. As there is no steam-pressure left in the slide-box when running without steam, the piston 16 of the distributing-valve is not pressed upward any more, and the piston must therefore assume the position shown in Fig. 5.

The purpose of the arrangement of the two press-cylinders P P in lieu of a single one is merely a structural measure, as it simplifies the actuating-gear. Each of the cylinders serves to force the oil into the corresponding atomizing-valve $v'$ or $v^2$, which latter feed the atomized oil to one cylinder side each. With correct position of the cock C the oil flows from the tank D by its own weight to the cylinders P P, or it can be forced into the cylinders by firmly screwing down the lid or cover provided on the tank.

I claim—

1. In a central lubricating apparatus for locomotives, the combination of a reservoir D, a double spraying device E, distributing-valves, double force-feed cylinders P, P, a three-way cock by which the cylinders P P can be connected either with the reservoir D or the double spraying device E, the said distributing-valves being arranged in proximity to the steam-cylinders, said distributing-valves being connected by pipe-conduits with the spraying apparatus and with the slide-valve casing and cylinder, substantially as described.

2. In a central lubricating apparatus, the spraying device, a double-acting distributing-valve, the chamber of which communicates by means of a lateral port 13, with the spraying device and by ports 11 and 12, with the slide and the cylinder-chamber respectively, and said valve being provided with a piston 16 and two conical seats 14 and 15 in such a manner that the valve, when the locomotive runs under steam, is pressed by the steam admitted through the lower port 11 upon its upper seat and allows the lubricant to reach the slide, while, when running without steam, the valve is pressed upon its lower seat and the lubricant is conducted through the port 12, leading to the steam-cylinder.

In witness whereof I have hereunto set my hand in presence of two witnesses.

FRANZ WAGNER.

Witnesses:
OSCAR BOCK,
ANDREW MIRY.